(12) United States Patent
Tetsuka et al.

(10) Patent No.: US 10,569,756 B2
(45) Date of Patent: Feb. 25, 2020

(54) DRIVING FORCE CONTROL DEVICE FOR SADDLED VEHICLE

(71) Applicant: HONDA MOTOR CO., LTD., Minato-ku, Tokyo (JP)

(72) Inventors: Takashi Tetsuka, Wako (JP); Naoki Sakamoto, Wako (JP); Yukio Yokogawa, Wako (JP); Shinji Misawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 16/089,554

(22) PCT Filed: Feb. 22, 2017

(86) PCT No.: PCT/JP2017/006576
§ 371 (c)(1),
(2) Date: Sep. 28, 2018

(87) PCT Pub. No.: WO2017/169324
PCT Pub. Date: Oct. 5, 2017

(65) Prior Publication Data
US 2019/0111906 A1    Apr. 18, 2019

(30) Foreign Application Priority Data

Mar. 29, 2016   (JP) ................................ 2016-066384

(51) Int. Cl.
*B60W 10/02*     (2006.01)
*B60W 50/08*     (2020.01)
(Continued)

(52) U.S. Cl.
CPC ............ *B60W 10/02* (2013.01); *B60W 10/06* (2013.01); *B60W 10/10* (2013.01);
(Continued)

(58) Field of Classification Search
None
See application file for complete search history.

(56) References Cited

U.S. PATENT DOCUMENTS

| 5,741,200 A | * | 4/1998 | Taniguchi | F16H 61/20 |
| | | | | 477/114 |
| 6,918,854 B2 | * | 7/2005 | Okada | B60K 31/04 |
| | | | | 477/114 |

(Continued)

FOREIGN PATENT DOCUMENTS

| CN | 1840928 A | 10/2006 |
| CN | 2841499 Y | 11/2006 |

(Continued)

OTHER PUBLICATIONS

Office Action issued on Sep. 26, 2019 over the corresponding Chinese Patent Application No. 201780032332.X with the English translation thereof.

(Continued)

*Primary Examiner* — Dirk Wright
(74) *Attorney, Agent, or Firm* — Carrier Blackman & Associates, P.C.; Joseph P. Carrier; William D. Blackman

(57) ABSTRACT

A driving force control device for saddled vehicle includes a transmission that transmits driving force of an engine to a driving wheel of a vehicle at predetermined reduction ratio; a clutch that connects/disconnects the driving force between the engine and the transmission; and a controller that controls the transmission and the clutch. The controller permits selection of a normal mode in which the reduction ratio of the transmission is varied according to a running condition and a slow mode permitting slow forward movement and slow backward movement by varying the reduction ratio of the transmission to a fixed reduction ratio according to predetermined operation, and the controller holds the clutch in a partial clutch engagement condition so as to prevent the (Continued)

vehicle from moving forward or backward when the slow mode is selected and no predetermined operation is performed.

20 Claims, 10 Drawing Sheets

(51) Int. Cl.
    *F16H 59/66*     (2006.01)
    *B60W 30/18*     (2012.01)
    *B60W 10/06*     (2006.01)
    *F16H 61/688*     (2006.01)
    *F16D 48/02*     (2006.01)
    *B60W 10/113*     (2012.01)
    *B60W 10/10*     (2012.01)

(52) U.S. Cl.
    CPC .... *B60W 10/113* (2013.01); *B60W 30/18036* (2013.01); *B60W 30/18063* (2013.01); *B60W 30/18118* (2013.01); *B60W 50/082* (2013.01); *F16D 48/02* (2013.01); *F16H 59/66* (2013.01); *F16H 61/688* (2013.01); *B60W 2300/36* (2013.01); *B60W 2520/16* (2013.01); *B60W 2520/28* (2013.01); *B60W 2540/10* (2013.01); *B60W 2540/12* (2013.01); *B60W 2550/142* (2013.01); *B60W 2710/023* (2013.01); *B60W 2710/0677* (2013.01); *B60Y 2200/12* (2013.01)

(56) References Cited

U.S. PATENT DOCUMENTS

| | | | |
|---|---|---|---|
| 7,041,031 B2* | 5/2006 | Wheeler | B60W 10/02 477/110 |
| 7,329,206 B2* | 2/2008 | Tanaka | F16D 48/08 477/176 |
| 7,470,214 B2 | 12/2008 | Kumazawa | |
| 7,815,543 B2* | 10/2010 | Kakiuchi | F16H 61/143 477/176 |
| 2010/0145582 A1 | 6/2010 | Yamamoto et al. | |
| 2015/0274257 A1 | 10/2015 | Sakamoto et al. | |
| 2016/0039421 A1 | 2/2016 | Kaneta et al. | |

FOREIGN PATENT DOCUMENTS

| | | |
|---|---|---|
| CN | 101779066 A | 7/2010 |
| CN | 103153747 A | 6/2013 |
| CN | 103895637 A | 7/2014 |
| JP | S61-129329 A | 6/1986 |
| JP | 2002-089589 A | 3/2002 |
| JP | 4219582 B2 | 2/2009 |
| JP | 2010-151160 A | 7/2010 |
| JP | 2015-194213 A | 11/2015 |
| JP | 2016-037254 A | 3/2016 |

OTHER PUBLICATIONS

PCT/ISA/210 from International Application PCT/JP2017/006576 and the English translation thereof.
Taiwanese Office Action issued in the corresponding Patent Application 106109317 dated Jul. 26, 2018.

* cited by examiner

DRIVING FORCE CONTROL DEVICE FOR SADDLED VEHICLE

TECHNICAL FIELD

The present invention relates to a driving force control device for saddled vehicle that enables slow forward/backward movement by switching operation without operating a throttle and a clutch.

BACKGROUND ART

A configuration that enables slow forward/backward movement by switching operation without operating a throttle and a clutch so as to facilitate handling operation of a vehicle in a state in which a rider is seated on a seat or gets off the seat in saddled vehicle such as a large-sized motorcycle is known.

In a patent literature 1, in a motorcycle provided with a dual clutch transmission equipped with a first clutch for connecting/disconnecting transmission of driving force by odd-numbered stage gears and a reverse gear and a second clutch for connecting/disconnecting transmission of driving force by even-numbered stage gears, a configuration for enabling slow forward movement in a second gear and slow backward movement in the reverse gear using a shift-up switch and a shift-down switch respectively provided to a handlebar switch is disclosed.

CITATION LIST

Patent Literature

Patent Literature 1: JP-A No. 2015-194213

SUMMARY OF INVENTION

Technical Problem

In a case of a four-wheeled vehicle, to prevent a vehicle from rolling back when foot transfer from a brake pedal to an accelerator pedal is delayed in starting on a slope, an apparatus for preventing from rolling back by holding wheel braking force by a braking device until sufficient driving force is transmitted to the wheel is known. It is conceivable that the braking device is also operated to prevent a vehicle from suddenly moving on a slope and others while a slow mode is selected as described in the patent literature 1, however, it is desired that in a case of a saddled vehicle in which orientation of a vehicle body readily varies by the operation of the braking device, rolling back is prevented by a method of more stabilizing behavior of the vehicle body.

An object of the present invention is to provide a driving force control device for saddled vehicle for preventing a vehicle provided with a slow mode from rolling back on a slope without using a braking device.

Solution to Problems

To achieve the afore-mentioned object, the present invention has a first feature in a driving force control device for saddled vehicle, comprising a transmission (40) that transmits driving force of an engine (100) to a driving wheel (WR) of a vehicle (1) at predetermined reduction ratio; a clutch (108) that connects/disconnects the driving force between the engine (100) and the transmission (40); and a controller (106) that controls the transmission (40) and the clutch (108), in that the controller (106) is configured to enable selecting a normal mode in which the reduction ratio of the transmission (40) is varied according to a running condition and a slow mode for enabling slow forward movement and slow backward movement by varying the reduction ratio of the transmission (40) to fixed reduction ratio according to predetermined operation, and the controller (106) holds the clutch (108) in a partial clutch engagement condition so as to prevent the vehicle (1) from moving forward or backward when the slow mode is selected and no predetermined operation is performed.

The present invention has a second feature in that the clutch (108) is a dual clutch including a first clutch (108A) engaged in the slow backward movement and a second clutch (108B) engaged in the slow forward movement, means (139) for detecting an inclination in a pitching direction of the vehicle (1) is provided, in a case of an up-slope, the second clutch (108B) is held in a partial clutch engagement condition, and in a case of a down-slope, the first clutch (108A) is held in the partial clutch engagement condition.

The present invention has a third feature in that the controller (106) holds both the first clutch (108A) and the second clutch (108B) in the partial clutch engagement condition when a road surface is judged as a flat hardly inclined in the pitching direction.

The present invention has a fourth feature in that predetermined operation for slow forward movement or slow backward movement in the slow mode is an operation of shift operation means (64, 66) for directing shift up and shift down of the transmission (40).

The present invention has a fifth feature in that the transmission (40) includes a plurality of forward gears and a single backward gear, and when the slow mode is selected, either the first clutch (108A) is engaged for transmitting the driving force by the backward gear, or the second clutch (108B) is engaged for transmitting the driving force by the second-speed gear out of the plurality of forward gears.

The present invention has a sixth feature to comprise a mode switch (67) for switching the normal mode to the slow mode.

The present invention has a seventh feature to comprise braking devices (63, 69) that make the driving wheel (WR) of the vehicle (1) and another wheel (WF) generate braking force, wherein the controller (106) holds braking force in predetermined time even if control force decreases when the control force of the braking devices (63, 69) is equal to or exceeds a predetermined value while the slow mode is selected.

The present invention has an eighth feature in that when the predetermined operation for the slow forward movement and the slow backward movement is performed while the braking force is held, the braking force is released after the driving force starts to be transmitted to the driving wheel (WR).

The present invention has an ninth feature in that a throttle controller (102) that adjusts output of the engine (100) is a throttle-by-wire type for driving a throttle valve by a motor (144) according to at least turning angle information of a throttle grip, and while the slow mode is selected, turning operation for output of the engine (100) of the throttle grip is invalidated.

The present invention has a tenth feature in that the clutch (108) is a dual clutch configured by a first clutch (108A) engaged in the slow backward movement and a second clutch (108B) engaged in the slow forward movement, a wheel speed sensor (170) for detecting wheel speed of the vehicle (1) is provided, the controller (106) judges an inclination in a pitching direction of the vehicle (1) on the basis of the wheel speed in a state in which the slow mode is selected, the second clutch (108B) is held in the partial clutch engagement condition in a case of an up-slope, and the first clutch (108A) is held in the partial clutch engagement condition in a case of a down-slope.

Advantageous Effects of Invention

According to the first feature, the controller (106) is configured to enable selecting a normal mode in which the reduction ratio of the transmission (40) is varied according to a running condition and a slow mode for enabling slow forward movement and slow backward movement by varying the reduction ratio of the transmission (40) to fixed reduction ratio according to predetermined operation, and the controller (106) holds the clutch (108) in a partial clutch engagement condition so as to prevent the vehicle (1) from moving forward or backward when the slow mode is selected and no predetermined operation is performed. Therefore, forward/backward movement of a vehicle body can be prevented without operating the braking device when the slow mode is selected. Hereby, stability of the vehicle body in the slow mode can be enhanced.

According to the second feature, the clutch (108) is a dual clutch including a first clutch (108A) engaged in the slow backward movement and a second clutch (108B) engaged in the slow forward movement, means (139) for detecting an inclination in a pitching direction of the vehicle (1) is provided, in a case of an up-slope, the second clutch (108B) is held in a partial clutch engagement condition, and in a case of a down-slope, the first clutch (108A) is held in the partial clutch engagement condition. Therefore, only a required clutch in a dual clutch can be operated to prevent the vehicle body from rolling back when an upslope or a downslope is detected.

According to the third feature, the controller (106) holds both the first clutch (108A) and the second clutch (108B) in the partial clutch engagement condition when a road surface is judged as a flat hardly inclined in the pitching direction. Therefore, forward/backward movement of the vehicle body in the slow mode can be also prevented on the level ground.

According to the fourth feature, the predetermined operation for slow forward movement or slow backward movement in the slow mode is an operation of shift operation means (64, 66) for directing shift up and shift down of the transmission (40). Therefore, operation for slow forward movement and slow backward movement is enabled without increasing the number of switches by using shift operation means used when a normal mode is selected for operation means for slow forward movement and slow backward movement. Hereby, when the shift operation means is provided to a handlebar switch of the vehicle, a case of the handlebar switch is prevented from increasing in size and deterioration of operability by increasing the number of switches can be prevented.

According to the fifth feature, the transmission (40) includes a plurality of forward gears and a single backward gear, and when the slow mode is selected, either the first clutch (108A) is engaged for transmitting the driving force by the backward gear, or the second clutch (108B) is engaged for transmitting the driving force by the second-speed gear out of the plurality of forward gears. Therefore, slow forward/backward movement in the slow mode, a stop on the level ground and rolling back on a slope can be prevented utilizing a configuration of a dual clutch type transmission.

According to the sixth feature, the driving force control device comprises a mode switch (67) for switching the normal mode to the slow mode. Therefore, the operability can be enhanced by setting a dedicated switch.

According to the seventh feature, the driving force control device comprises braking devices (63, 69) that make the driving wheel (WR) of the vehicle (1) and another wheel (WF) generate braking force, wherein the controller (106) holds braking force in predetermined time even if control force decreases when the control force of the braking devices (63, 69) is equal to or exceeds a predetermined value while the slow mode is selected. Therefore, more stability of the vehicle body can be enhanced by controlling the braking device in addition to driving force control in the slow mode.

According to the eighth feature, when the predetermined operation for the slow forward movement and the slow backward movement is performed while the braking force is held, the braking force is released after the driving force starts to be transmitted to the driving wheel (WR). Therefore, additional operation for releasing braking force is not required and the operability in the slow mode can be enhanced.

According to the ninth feature, a throttle controller (102) that adjusts output of the engine (100) is a throttle-by-wire type for driving a throttle valve by a motor (144) according to at least turning angle information of a throttle grip, and while the slow mode is selected, turning operation for output of the engine (100) of the throttle grip is invalidated. Therefore, driving force is unchanged even if throttling is performed while the slow mode is selected and operation for slow forward movement or slow backward movement is facilitated.

According to the tenth feature, the clutch (108) is a dual clutch configured by a first clutch (108A) engaged in the slow backward movement and a second clutch (108B) engaged in the slow forward movement, a wheel speed sensor (170) for detecting wheel speed of the vehicle (1) is provided, the controller (106) judges an inclination in a pitching direction of the vehicle (1) on the basis of the wheel speed in a state in which the slow mode is selected, the second clutch (108B) is held in the partial clutch engagement condition in a case of an up-slope, and the first clutch (108A) is held in the partial clutch engagement condition in a case of a down-slope. Therefore, an upslope or a downslope is judged on the basis of output of a wheel speed sensor and rolling back of the vehicle body can be prevented.

DESCRIPTION OF EMBODIMENT

Figure 1:
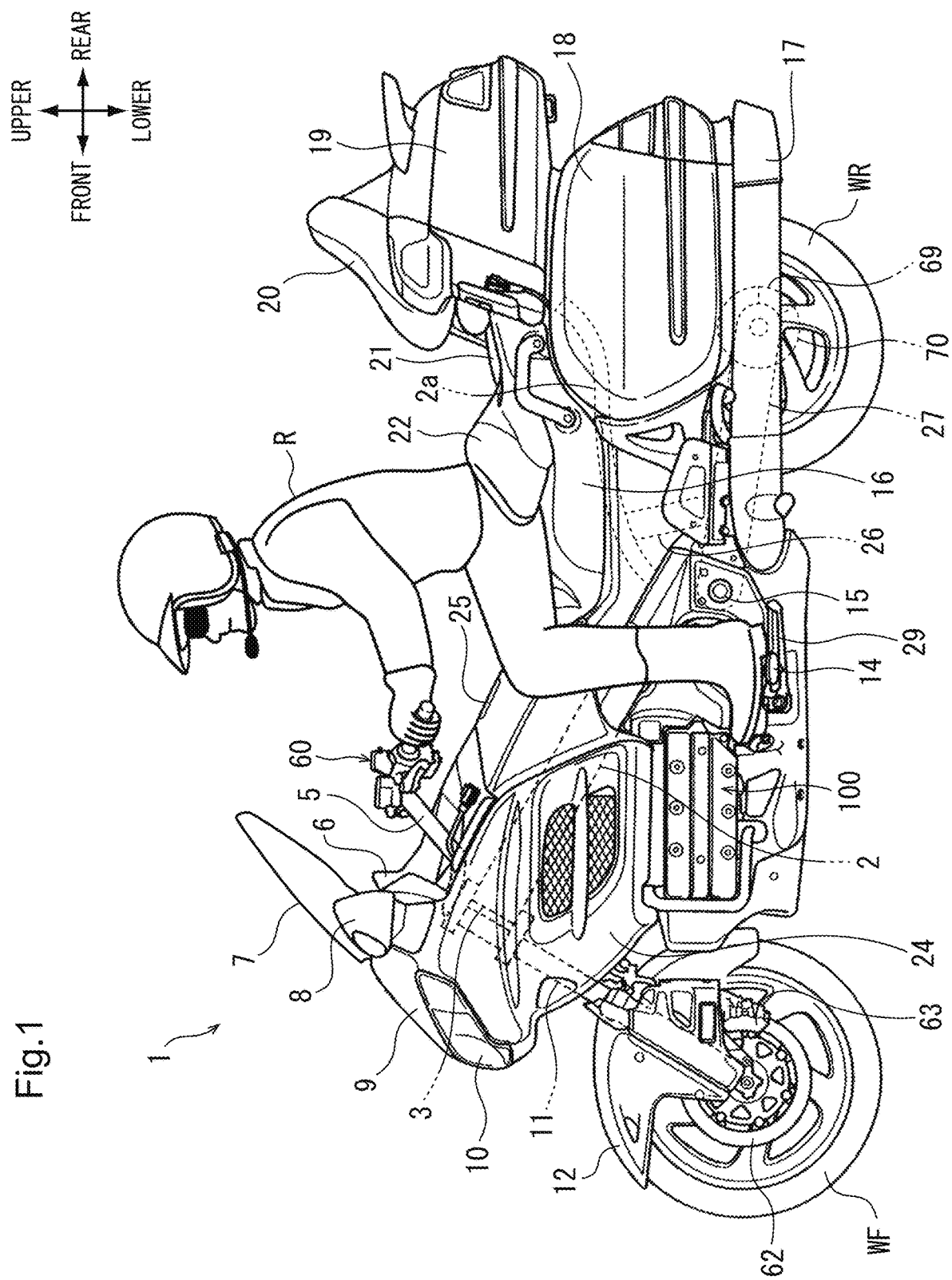
FIG. 1 is a left side view showing a motorcycle to which a driving force control device according to one embodiment of the present invention is applied.

FIG. 1 is a left side view showing a motorcycle 1 to which a driving force control device according to one embodiment of the present invention is applied. The motorcycle 1 uses a large-sized horizontal opposed six-cylinder engine provided with a dual clutch type transmission for a power source and is a large-sized straddle-type vehicle provided with a large-sized cowling and plural housing cases.

A head pipe 3 that turnably journals a steering stem (not shown) is provided to the front of a body frame 2. A pair of right and left front forks 11 that turnably journal a front wheel WF are fixed to the steering stem and are steerably supported. A steering handlebar 5 is attached to an upper end of the front fork 11 and a front fender 12 that covers an upper part of the front wheel WF is attached to the substantial center of the front fork 11.

An engine 100 is hung and fixed from/to lower parts of a pair of right and left main tubes extended backward and downward in a vehicle body from the head pipe 3. A pivot 15 that swingably journals a swing arm 27 is provided to a rear end of the main tube at the back of the engine 100. A rear frame 2a which is extended backward and upward from an upside of the pivot 15 and which supports a seat 16, a pair of right and left pannier cases 18 and others is provided to a rear end of the body frame 2. A pair of right and left footrests 14 for a rider R are attached in front of and on the downside of the pivot 15.

The swing arm 27 that rotatably journals a rear wheel WR as a driving wheel is hung in the vehicle body by a rear cushion 26 connected to the rear frame 2a. Driving force of the engine 100 is transmitted to the rear wheel WR via a drive shaft (not shown) that pierces the swing arm 27 and combustion gas of the engine 100 is exhausted from rear ends of a pair of right and left mufflers 17.

The pair of right and left pannier cases 18 as a housing box are attached on upsides of the mufflers 17. A loin guard 22 for the rider R seated on the front side and a pillion 21 are provided to the seat 16 and a backrest 20 for a pillion passenger is provided to the front of a top case 19 as a housing box arranged in the center in a vehicle width direction.

The front side of the head pipe 3 is covered with a front cowl 9 provided with a headlight 10. A pair of right and left side cowls 24 covering the frame 2 and an upper part of the engine 100 are coupled to the rear of the front cowl 9. A pair of right and left rearview mirrors 8 integrated with the corresponding blinker are attached to positions outside the front cowl 9 in the vehicle width direction in front of the handlebar 5. A refueling lid 25 of a fuel tank is provided between the seat 16 and the handlebar 5.

A windscreen 7 of which position in a direction of height can be adjusted is arranged in front of the rider R between the right and left rearview mirrors 8. A meter panel 6 is provided in the center in the vehicle width direction immediately after the windscreen 7 and a left handlebar switch 60 provided with plural switches is arranged on the left side of the handlebar 5 in the vehicle width direction.

A front brake disc 62 and a front brake caliper 63 that holds the front brake disc between to generate frictional force are provided to the front wheel WF as another wheel for the rear wheel WR. A rear brake disc 70 and a rear brake caliper 69 are provided to the rear wheel WR. A brake on the front wheel side is operated by a brake lever mainly provided to the handlebar 5 on the right side in the vehicle width direction and a brake on the rear wheel side is operated by a brake pedal mainly arranged under the footrest 14 on the right side in the vehicle width direction. A side stand 29 is attached under the left footrest 14.

Figure 2:
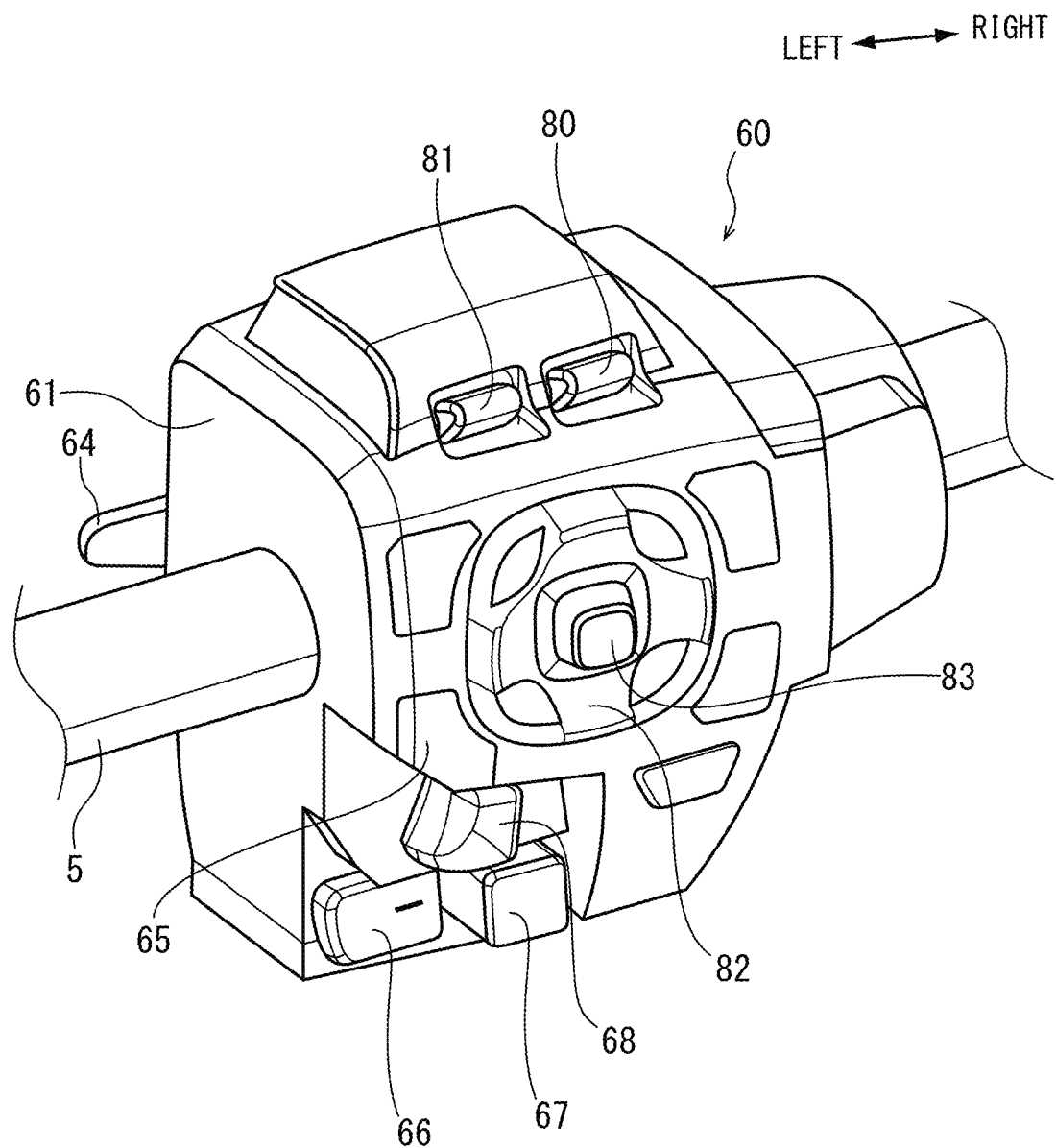
FIG. 2 is a perspective view showing a left handlebar switch.

FIG. 2 is a perspective view showing a left handlebar switch 60 provided to the handlebar 5 on the left side in the vehicle width direction. A housing 61 of the left handlebar switch 60 includes a cruciform button 82 and a decision button 83 respectively used for operating a navigation system and others, a volume switch 80, a screen height adjustment switch 81, a horn switch 65, a blinker switch 68, a mode switch 67, a shift-up switch 64 and a shift-down switch 66 respectively as shift operation means for operating a shift (for directing a shift) of the transmission.

The push-type horn switch 65 is arranged at the substantially same level as the handlebar 5. The volume switch 80 and the screen height adjustment switch 81 respectively of a vertically rocking type are laterally arranged in positions over the cruciform button 82. Besides, the blinker switch 68 that operates a turn signal lamp by laterally leaning the switch is arranged in a recess deeper by one stage under the horn switch 65.

The shift-up switch 64 arranged on the vehicle body front side of the housing 61 is arranged at the substantially same level as the handlebar 5. The shift-down switch 66 arranged at a lower end on the vehicle body back side of the housing 61 is arranged in a recess deeper by one more stages below the blinker switch 68. The mode switch 67 for switching an on-off state by protruding or backing an operating part is arranged on the right side of the shift-down switch 66. An operation face of the slow mode switch 67 is set in a position on the near side (on the vehicle body back side) of the shift-down switch 66 and deeper than (on the vehicle body front side of) the blinker switch 68 and is devised to prevent a thumb from touching other switches in operating each switch.

The shift-up switch 64 is suitable for operation for pulling on the near side with a forefinger of a left hand grasping a handlebar grip and the shift-down switch 66 is suitable for operation for pushing with the thumb of the left hand. Besides, both switches can be also readily operated at the same time in a state in which the handlebar grip is grasped with a palm.

As for the motorcycle 1 according to this embodiment, it is assumed to put the motorcycle in/out of parking space in addition to a normal mode, a rider R straddles the motorcycle 1, and the rider advances/backs the vehicle body at low speed. Or the motorcycle is configured so that a slow mode assuming operation (so-called handling operation) that the rider R stands on the side of the motorcycle 1 and advances/backs the vehicle body at low speed, supporting the vehicle can be selected. Velocity V assumed in a handling state is $0 \leq V < 8$ km/h for example. According to this setting, as the velocity is set in a range in which the rider can support the vehicle body with his/her body, operability of handling is satisfactory.

In this embodiment, the normal mode is turned to the slow mode by pushing the mode switch 67 in a state in which braking operation is performed while the transmission is neutral. When the shift-up switch 64 is pressed while the slow mode is selected, slow forward movement by driving force of the engine is performed and when the shift-down switch 66 is pushed, slow backward movement by the driving force of the engine is performed. When the mode switch 67 is pushed operating the brake in the slow mode, the slow mode is returned to the normal mode. Slow forward movement and slow back movement are both executed at predetermined vehicle speed below 8 km/h.

When the slow mode is selected, adjustment of driving force by turning operation of a throttle grip is invalidated. A throttle valve is automatically controlled so that fixed engine driving force suitable for slow running is generated or so that engine driving force for enabling running at fixed slow speed independent of an inclination of a road surface is generated. Hereby, as operation for running in the slow mode is limited to the shift-up switch 64 and the shift-down switch 66, a malfunction is prevented and slow running avoiding linear reaction such as operation by the throttle grip is enabled.

A throttle for adjusting output of the engine 100 adopts a throttle-by-wire system that drives a throttle valve by a motor. Hereby, high-precision output control is also enabled in slow running and control such as smoothing reaction of engine output to operation using the shift operation means is also facilitated.

Figure 3:
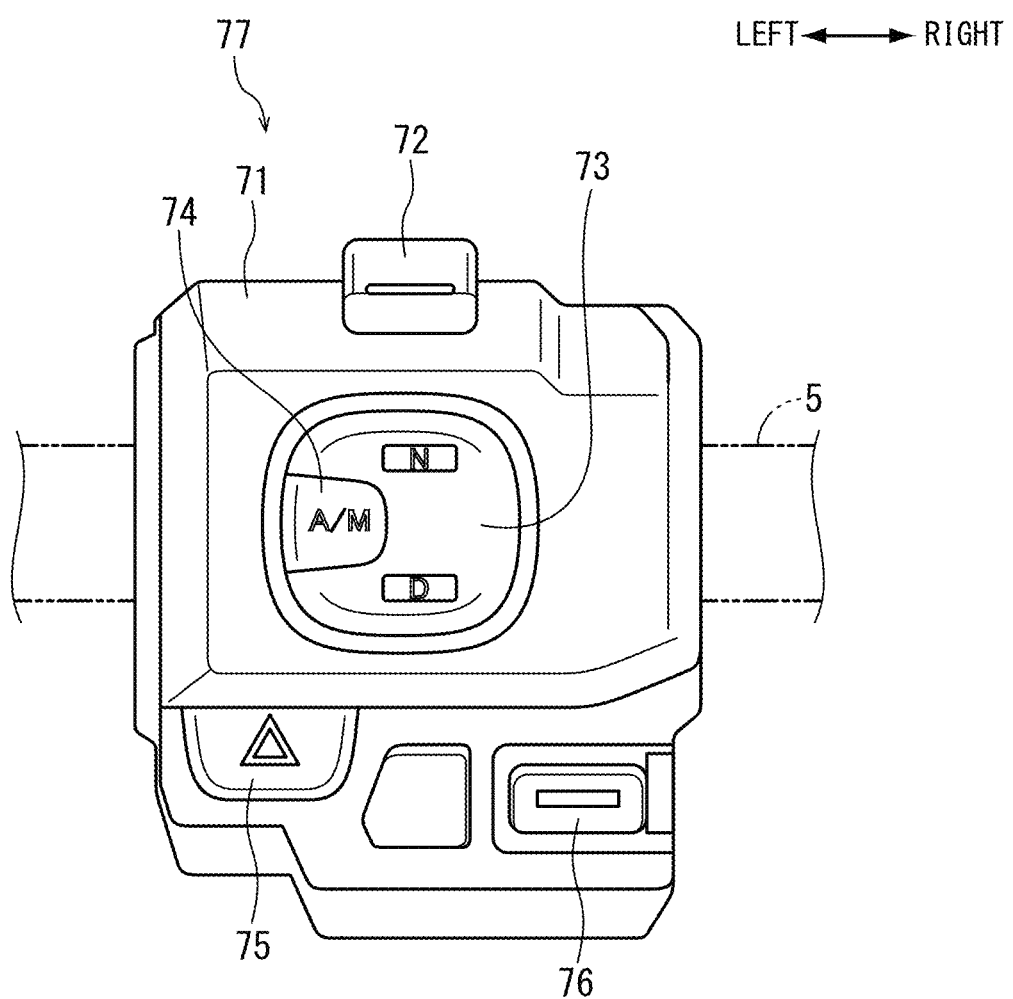
FIG. 3 is a front view showing a right handlebar switch.

FIG. 3 is a front view showing a right handlebar switch 77 provided to the handlebar 5 on the right side in the vehicle width direction. A housing 71 of the right handlebar switch 77 includes an engine stop switch 72, a neutral-drive (N-D) transfer switch 73, an automatic/manual transfer switch 74, a hazard lamp switch 75 and a starter switch 76.

The vertically rocking type N-D transfer switch 73 switches between a neutral state (N) of the transmission and a drive mode (D) for automatically controlling the transmission and the clutch on the basis of vehicle speed and engine speed. The push-type automatic/manual transfer switch 74 switches between an automatic mode for automatic shift operation in running in the drive mode and a manual mode for shift operation according to operation of the shift-up switch 64 and the shift-down switch 66.

Figure 4:
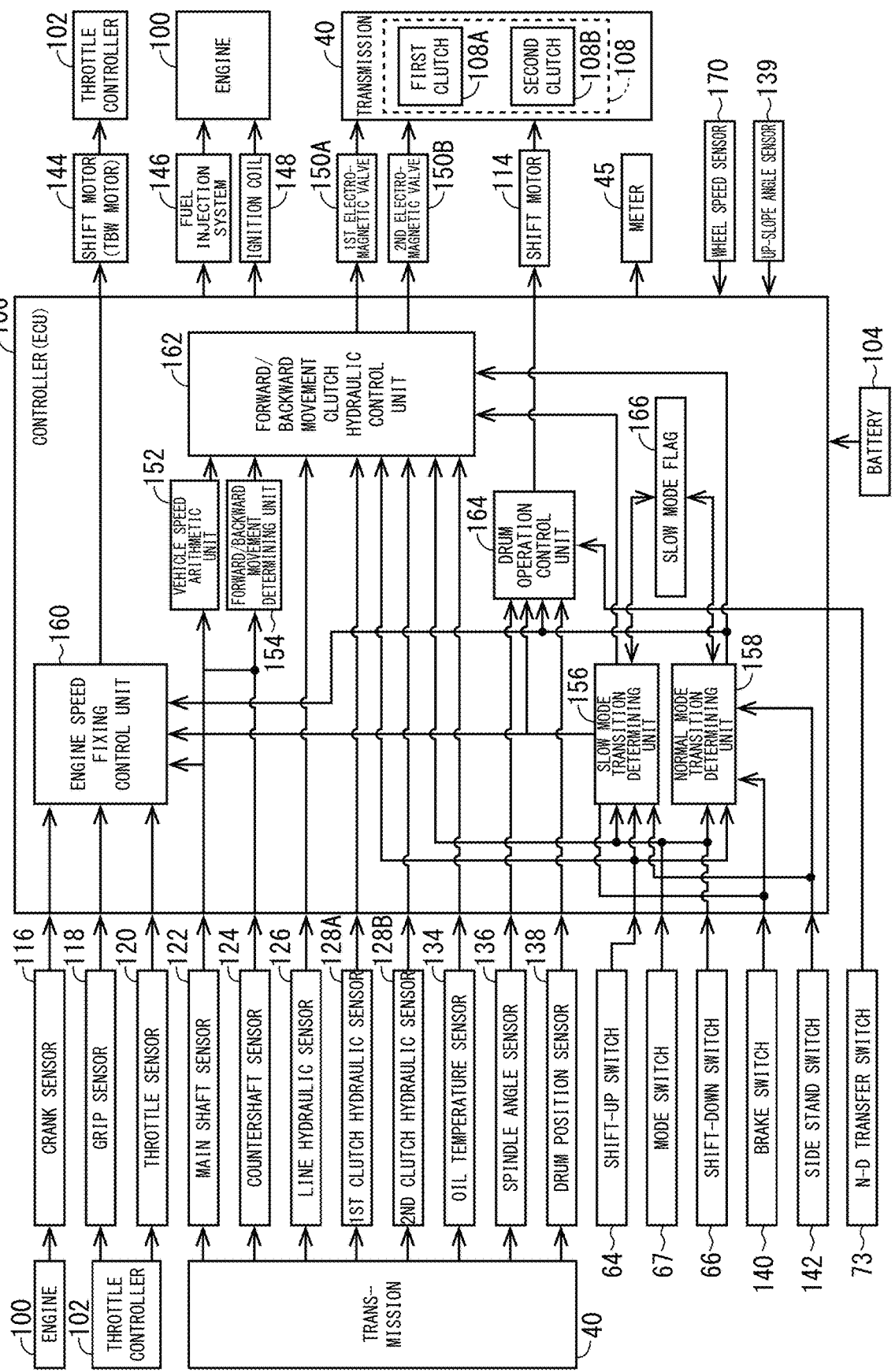
FIG. 4 is a block diagram showing the driving force control device for the saddled vehicle.
Figure 5:
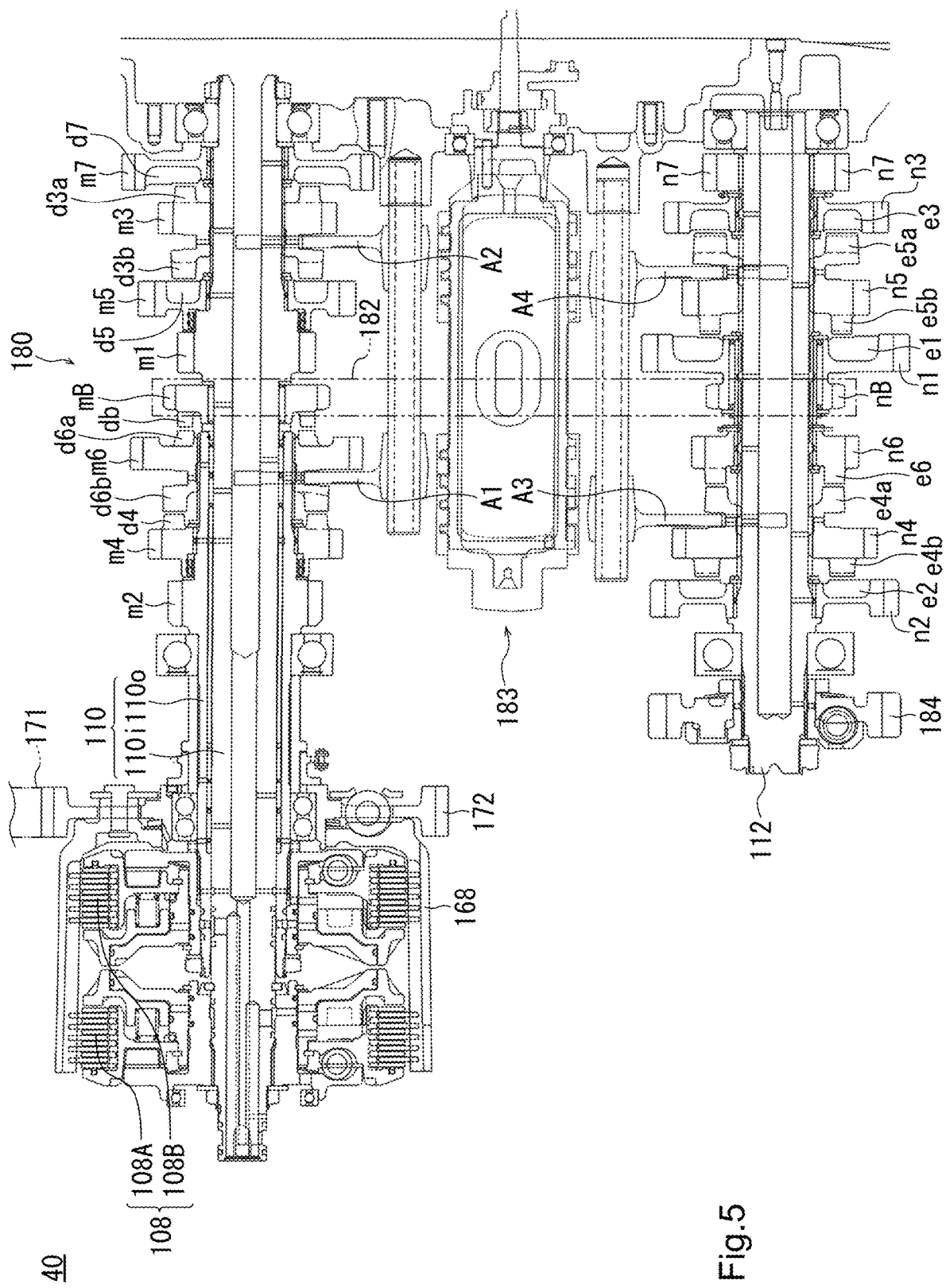
FIG. 5 is a sectional view showing the transmission.
Figure 6:
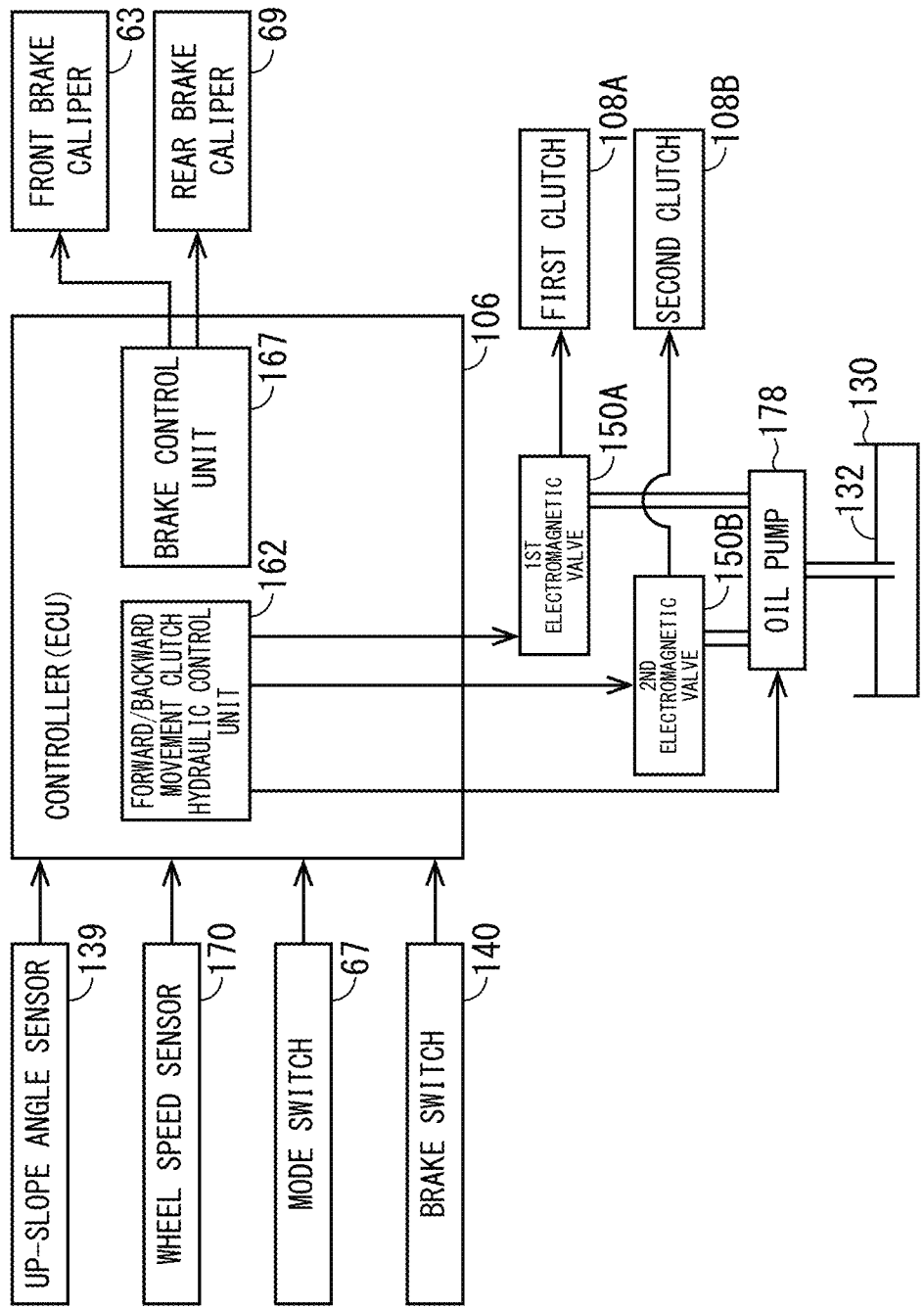
FIG. 6 is a block diagram showing a hydraulic control path of the clutch.

FIG. 4 is a block diagram showing the driving force control device for the saddled vehicle according to this embodiment. FIG. 5 is a sectional view showing the transmission 40 and FIG. 6 is a block diagram showing a hydraulic control path of the clutch.

The motorcycle 1 is provided with the engine 100 that drives a crankshaft, a throttle controller (a throttle-by-wire (TBW) type) 102 that electronically controls the throttle, the transmission 40 that transmits output of the crankshaft to a driving shaft and a controller (ECU) 106 that receives power from a battery 104 and controls the motorcycle 1.

The transmission 40 is driven by a hydraulic system and is provided with a dual clutch 108 configured by a first clutch 108A and a second clutch 108B. The clutch 108 is a normally open type that increases clutch torque according to an increase of lubricating oil pressure. The transmission 40 is provided with a main shaft 110 and a countershaft 112 respectively arranged in parallel with the crankshaft (not shown), a shift spindle (not shown) driven by a shift motor 114 and a shift drum 183 that selectively engages the corresponding transmission gears according to a turning angle of the shift spindle to interlock driving force.

In normal running, the countershaft 112 is rotated in only one direction, however, in this embodiment, in backward movement in the slow mode, the countershaft is rotated in a reverse direction.

Drive gears m1 to m7 for seven speeds are provided to the main shaft 110 and driven gears n1 to n7 for seven speeds are provided to the countershaft 112. Each drive gear m1 to m7 and each driven gear n1 to n7 of corresponding speed are mutually engaged and configure a pair of transmission gears corresponding to each speed (see FIG. 5).

A crank sensor 116 that detects a number of revolutions of the crankshaft is attached to the engine 100, and a grip sensor 118 that detects a turning angle of the throttle grip attached on the right side of the handlebar 5 and a throttle sensor 120 that detects an angle of a throttle valve of the engine 100 are connected to the throttle controller 102.

The transmission 40 includes a main shaft sensor 122 that detects a number of revolutions of the main shaft 110, a countershaft sensor 124 that detects a number of revolutions of the countershaft 112, a line hydraulic sensor 126 that detects oil pressure in the hydraulic path of the clutch 108, a first clutch hydraulic sensor 128A that detects oil pressure of the first clutch 108A, a second clutch hydraulic sensor 128B that detects oil pressure of the second clutch 108B, an oil temperature sensor 134 that detects temperature of oil 132 in an oil pan 130 (see FIG. 6), a spindle angle sensor 136 that detects a turning angle of the shift spindle and a drum position sensor 138 that detects a position of the shift drum 183.

Detection signals output from various sensors are input to the controller 106. Various signals from the slow forward movement switch (the shift-up switch) 64, the slow backward movement switch (the shift-down switch) 66, a brake switch 140 and a side stand switch 142 are input to the controller 106 in addition to these detection signals.

The shift-up switch 64 and the shift-down switch 66 in this embodiment respectively output an on signal while each switch is operated and output an off signal while no switch is operated. The brake switch 140 also outputs an on signal while the brake lever or the brake pedal is operated and outputs an off signal while no brake switch is operated. The side stand switch 142 outputs an on signal when the side stand 29 lowers and outputs an off signal when the side stand is lifted.

The controller 106 controls a motor (a TBW motor) 144 of the throttle controller 102, a fuel injection system 146 and an ignition coil 148 of the engine 100, the shift motor 114 of the transmission 40, a first electromagnetic valve 150A for controlling oil pressure of the first clutch 108A and a second electromagnetic valve 150B for controlling oil pressure of the second clutch 108B respectively on the basis of detection signals from various sensors and signals from various switches. The controller 106 instructs the meter 45 to output operation results in the controller 106. The meter 45 outputs the input operation results to an analog display, a digital display and a lamp display.

The controller 106 mainly configures a determination section for realizing the slow mode by a vehicle speed arithmetic unit 152, a forward/backward movement determining unit 154, a slow mode transition determining unit 156, a normal mode transition determining unit 158, an engine speed fixing control unit 160, a forward/backward movement clutch hydraulic control unit 162 and a drum operation control unit 164.

The vehicle speed arithmetic unit 152 operates vehicle speed on the basis of a detection signal from the countershaft sensor 124. The forward/backward movement determining unit 154 determines forward movement or backward movement on the basis of the detection signal from the countershaft sensor 124. The engine speed fixing control unit 160 detects engine speed on the basis of output of the main shaft sensor 122.

The slow mode transition determining unit 156 determines whether transition to the slow mode is performed or not on the basis of signals from various sensors and various switches. When the transition to the slow mode is performed, '1' is set to a slow mode flag 166. A normal mode transition determining unit 158 determines whether transition to the normal mode is performed or not on the basis of signals from various sensors and various switches. When the transition to the normal mode is performed, the slow mode flag 166 is reset to '0'.

The engine speed fixing control unit 160 invalidates throttle operation of the right grip by the rider R when the slow mode is selected and controls engine speed to be a fixed state (for example, an idle condition). The forward/backward movement clutch hydraulic control unit 162 executes clutch hydraulic control for the normal mode and the slow mode on the basis of vehicle speed information from the vehicle speed arithmetic unit 152, a determination result from the forward/backward movement determining unit 154 and detection signals from various hydraulic sensors (126, 128A, 128B) and an oil temperature sensor 134.

The forward/backward movement clutch hydraulic control unit 162 has a feature that partial clutch engagement control over the first clutch 108A and the second clutch 108B is executed using switching to the slow mode for a trigger so as to enhance stability of the vehicle body in the slow mode. Detailedly, in switching to the slow mode, for vehicle body rolling back prevention control, the second clutch 108B on the forward movement side is turned to a partial clutch engagement condition on an uphill so as to prevent backward sliding down, besides, the first clutch 108A on the backward movement side is turned to a partial clutch engagement condition on a downhill so as to prevent forward sliding down, further, when a road surface is flat, both the first and second clutches are turned to a partial clutch engagement condition, and the vehicle body is prevented from moving forward or backward. Hereby, stability of the vehicle body in slow forward/backward movement can be enhanced.

The drum operation control unit 164 drives the shift motor 114 so that a position of the shift drum 183 is a preset position in the slow mode in transition from the normal mode to the slow mode. Besides, in transition from the slow mode to the normal mode, the drum operation control unit drives the shift motor 114 so that the shift drum 183 is located in a neutral position. Feedback control is applied to a signal to the shift motor 114 on the basis of detection signals from the spindle angle sensor 136 and a drum position sensor 138.

As shown in FIG. 5, the clutch 108 is provided with the odd-numbered stage disc clutch (the first clutch 108A) and the even-numbered stage disc clutch (the second clutch 108B) respectively mutually coaxial and adjacent. The main shaft 110 has double pipe structure in which an inner shaft (an inner main shaft) 110i and an outer shaft (an outer main shaft) 110o are coaxially provided. The first clutch 108A is provided to one end of the inner shaft 110i and the second clutch 108B is provided to one end of the outer shaft 110o.

A driven gear 172 engaged with a drive gear 171 of the crankshaft is coaxially provided to a clutch outer 168 shared by the first clutch 108A and the second clutch 108B and driving force from the crankshaft is input to the clutch outer 168 via the drive gear 171 and the driven gear 172. The driving force input to the clutch outer is individually transmitted to the inner shaft 110i and the outer shaft 110o according to a connected state of the first clutch 108A and the second clutch 108B.

As shown in FIG. 6, the connected state of the first clutch 108A and the second clutch 108B can be individually controlled depending upon whether oil pressure is fed from an oil pressure feeder 174 or not. The oil pressure feeder 174 is provided with a clutch controller 176 and an oil pump 178 that pumps up oil 132 in the oil pan 130 so as to feed it to the clutch 108. The clutch controller 176 is provided with the first electromagnetic valve 150A and the second electromagnetic valve 150B.

The first electromagnetic valve 150A controls oil pressure fed to the first clutch 108A according to an instruction from the controller 106. That is, the inner shaft 110i and the crankshaft are connected by applying oil pressure to the first clutch 108A. In the meantime, the above-mentioned connection is disconnected by decreasing oil pressure onto the first clutch 108A.

The second electromagnetic valve 150B controls oil pressure onto the second clutch 108B according to an instruction from the controller. That is, the outer shaft 110o and the crankshaft are connected by applying oil pressure onto the second clutch 108B. In the meantime, the above-mentioned connection is disconnected by decreasing oil pressure onto the second clutch 108B.

In running in the normal mode, either of the first clutch 108A or the second clutch 108B is connected and the other is disconnected. Hereby, power transmission in the transmission 40 is performed using any transmission gear pair coupled to the inner shaft 110i and the outer shaft 110o.

When the shift-up switch 64 or the shift-down switch 66 is operated, the next used transmission gear pair is selected out of the transmission gear pairs coupled to the inner shaft 110i and the outer shaft 110o. According to this selection, one connected clutch out of the first clutch 108A and the second clutch 108B is disconnected and the other clutch is connected. Power transmission in the transmission 40 is switched to the preselected transmission gear pair by the clutch switching operation and that is, shift up or shift down of the transmission 40 is performed.

Detailedly, as to the first, third, fifth and seventh drive gears, the first clutch 108A is connected and as to the second, fourth and sixth drive gears, the second clutch 108B is connected. That is, the clutch 108 performs a shift by alternately disconnecting/connecting both clutches from/to the first to the seventh drive gears every speed.

As shown in FIG. 5, the transmission 40 is a constant-mesh type in which the drive gears m1 to m7 and the driven gears n1 to n7 respectively corresponding to each speed are constantly engaged. Each gear m1 to m7 and each gear n1 to n7 are roughly classified into a fixed gear integrally rotatable with its supporting shaft (the main shaft 110 and the countershaft 112), a free gear relatively rotatable with the supporting shaft and axially immovable and a slide gear integrally rotatable with the supporting shaft and axially movable.

Concretely, the drive gears m1, m2 are fixed gears, the drive gears m3, m6 are slide gears, and the drive gears m4, m5, m7 are free gears. Besides, the driven gear n7 is a fixed gear, the driven gears n1 to n3 and n6 are free gears, and the driven gears n4 and n5 are slide gears. Each slide gear is engaged with its supporting shaft via splines.

The fixed gear m1, the free gear m5, the slide gear m3 and the free gear m7 are arrayed in the order on the inner shaft 110i from a position nearer to the clutch toward a farther position. Corresponding to these gears, the free gear n1, the slide gear n5, the free gear n3 and the fixed gear n7 are arrayed on the countershaft 112.

In the meantime, the fixed gear m2, the free gear m4 and the slide gear m6 are arrayed on the outer shaft 110o from a position nearer to the clutch 108 toward a farther position, and corresponding to these gears, the free gear n2, the slide gear n4 and the free gear n6 are arrayed on the countershaft 112. Hereby, the free gears of the countershaft 112 are engaged with the fixed gear or the slide gear of the main shaft 110, and the slide gear of the countershaft 112 is engaged with the free gear of the main shaft 110.

When the shift drum 183 is driven by the shift motor 114, four shift arms A1, A2, A3, A4 are axially slid, the slide gears m3, m6 being the drive gear and the slide gears n4, n5 being the driven gear are axially driven, and an engaged condition of a dog clutch between the adjacent gears is changed.

Dogs d3a, d3b axially protruded are provided to both sides of the drive gear m3. When the drive gear m3 is slid from a neutral position to one axial direction (rightward in the drawing), one dog d3a is fitted into a dog hole d7 of the drive gear m7. Similarly, when the drive gear m3 is slid from the neutral position to the other axial direction (leftward in the drawing), the other dog d3b is fitted into a dog hole d5 of the drive gear m5.

An axially protruded dog d4 is provided to one side of the drive gear m4. Dogs d6a, d6b axially protruded are also provided to both sides of the drive gear m6. When the drive gear m6 is slid from a neutral position to the axial left side, the other dog d6b is fitted to the dog of the drive gear m4.

Dogs e5a, e5b axially protruded are provided to both sides of the driven gear n5. When the driven gear n5 is slid from a neutral position to the axial right side, the one dog e5a is fitted into a dog hole e3 of the driven gear n3. Similarly, when the driven gear n5 is slid from the neutral position to the axial left side, the other dog e5b is fitted into a dog hole e1 of the driven gear n1.

An axially protruded dog e6 is provided to the other side of the driven gear n6. Dogs e4a, e4b axially protruded are also provided to both sides of the driven gear n4. When the driven gear n4 is slid from a neutral position to the axial right side, the one dog e4a is fitted to the dog e6 of the driven gear n6. Similarly, when the driven gear n4 is slid from the neutral position to the axial left side, the other dog e4b is fitted into a dog hole e2 of the driven gear n2.

States from each neutral condition to each shift up to the first to seventh speeds in the normal mode in which the inner shaft 110i is driven by the first clutch 108A will be described below. In shift-up operation in the normal mode, the countershaft 112 is rotated in a reverse direction to a rotation direction of the main shaft 110, that is, the countershaft is all normally rotated. Torque of this normal rotation is transmitted from an output gear 184 to the drive shaft and the motorcycle 1 is advanced.

When a turning angle of the shift spindle shows a neutral condition, the drive gears m3, m4 and the driven gears n4, n5 are located in their neutral positions and torque of the main shaft 110 is not transmitted to the countershaft 112. Switching between the neutral condition and a first-speed in-gear condition is executed by the N-D transfer switch 73 provided to the right handlebar switch 70.

When a turning angle of the shift spindle is changed from the neutral condition to the first speed according to operation of the N-D transfer switch 73, the driven gear n5 is axially moved on the left side. Hereby, torque of the inner shaft 110i is transmitted from the drive gear m1 to the countershaft 112 via the driven gears n1, n5.

When the turning angle of the shift spindle is changed from the first speed to the second speed, the first clutch 108A is disconnected, the outer shaft 110o is driven by the second clutch 108B, and the driven gear n4 is axially moved on the left side. Hereby, torque of the outer shaft 110o is transmitted from the drive gear m2 to the countershaft 112 via the driven gears n2, n4.

When the turning angle of the shift spindle is changed from the second speed to the third speed, the second clutch 108B is disconnected, the inner shaft 110i is driven by the first clutch 108A, and the driven gear n5 is axially moved on the right side. Hereby, torque of the inner shaft 110i is transmitted from the drive gear m3 to the countershaft 112 via the driven gears n3, n5.

When the turning angle of the shift spindle is changed from the third speed to the fourth speed, the first clutch 108A is disconnected, the outer shaft 110o is driven by the second clutch 108B, and the driven gear n6 is axially moved on the left side. Hereby, torque of the outer shaft 110o is transmitted from the drive gear m6 to the counter shaft 112 via the drive gear m4 and the driven gear n4.

When the turning angle of the shift spindle is changed from the fourth speed to the fifth speed, the second clutch 108B is disconnected, the inner shaft 110i is driven by the first clutch 108A, and the driven gear n3 is axially moved on the left side. Hereby, torque of the inner shaft 110i is transmitted from the drive gear m3 to the countershaft 112 via the drive gear m5 and the driven gear n5.

When the turning angle of the shift spindle is changed from the fifth speed to the sixth speed, the first clutch 108A is disconnected, the outer shaft 110o is driven by the second clutch 108B, the drive gear m6 is returned to the neutral position, and the driven gear n4 is axially moved on the right side. Hereby, torque of the outer shaft 110o is transmitted from the drive gear m6 to the countershaft 112 via the driven gears n6, n4.

When the turning angle of the shift spindle is changed from the sixth speed to the seventh speed, the second clutch 108B is disconnected, the inner shaft 110i is driven by the first clutch 108A, and the drive gear m3 is axially moved on the right side. Hereby, torque of the inner shaft 110i is transmitted from the drive gear m3 to the countershaft 112 via the drive gear m7 and the driven gear n7.

The transmission 40 is provided with a backward gear train 180 for backward movement. The backward gear train 180 is provided with a drive gear mB installed between the drive gear m1 of the inner shaft 110i and the drive gear m6 of the outer shaft 110o and a driven gear nB installed between the driven gears n1, n6 of the countershaft 112. The drive gear mB is a single free gear and the driven gear nB is a free gear integrated with the driven gear n1 and rotated together with the driven gear n1. A looped drive chain 182 is wound onto the drive gear mB and the driven gear nB so that the drive gear and the driven gear are rotated mutually in the same direction.

When the turning angle of the shift spindle is changed to an angle corresponding to a preset slow mode, the shift drum 183 is set in a preset position of the slow mode, the drive gear m6 is slid from the neutral position to the axial right side, and the driven gear n4 is slid from the neutral position to the axial left side. Hereby, the one dog d6a of the drive gear m6 is fitted into a dog hole db of the drive gear mB and the other dog e4b of the driven gear n4 is fitted into the dog hole e2 of the driven gear n2.

When the slow forward movement switch (the shift-up switch) 64 is operated after transition to the slow mode, forward movement operation at slow speed is performed. Detailedly, according to operation of the slow forward movement switch 64, the second clutch 108B is connected and the first clutch 108A is disconnected and torque of the crankshaft in the idle condition is transmitted to the outer shaft 110*o* via the second clutch 108B.

Torque of the outer shaft 110*o* is transmitted from the drive gear m2 to the countershaft 112 via the driven gear n2 and the countershaft 112 is normally rotated. Torque of the normal rotation is transmitted to the drive shaft and the motorcycle 1 is advanced at slow speed by the driving force of the engine.

In the meantime, when the slow backward movement switch (the shift-down switch) 66 is operated after transition to the slow mode, backward movement operation at slow speed is performed. Detailedly, according to operation of the slow backward movement switch 66, the first clutch 108A is connected and the second clutch 108B is disconnected, and the torque of the crankshaft in the idle condition is transmitted to the inner shaft 110*i* via the first clutch 108A.

Torque of the inner shaft 110*i* is transmitted from the drive gear m1 to the outer shaft 110*o* via the driven gears n1, nB, the drive chain 182, the drive gear mB and the drive gear m6. At this time, a rotation direction of the outer shaft 110*o* is reverse to a rotation direction of the inner shaft 110*i* and torque of the outer shaft 110*o* is transmitted from the drive gear m4 to the countershaft 112 via the driven gears n2, n4.

In this case, the countershaft 112 is rotated in the same direction as the inner shaft 110*i*. Torque in a reverse direction to that in forward running is transmitted to the drive shaft and the motorcycle 1 is moved backward at slow speed by driving force of the engine.

The motorcycle 1 is provided with a hydraulic brake system the braking force of which can be controlled by the controller (ECU) 106. A brake control unit 167 in the controller 106 not only supplies braking oil pressure to the front brake caliper 63 and the rear brake caliper 69 according to operation of a brake operator configured by the brake caliper and the brake pedal but can control braking force of the front and rear wheels independently or in conjunction on the basis of various sensor information.

Figure 7:
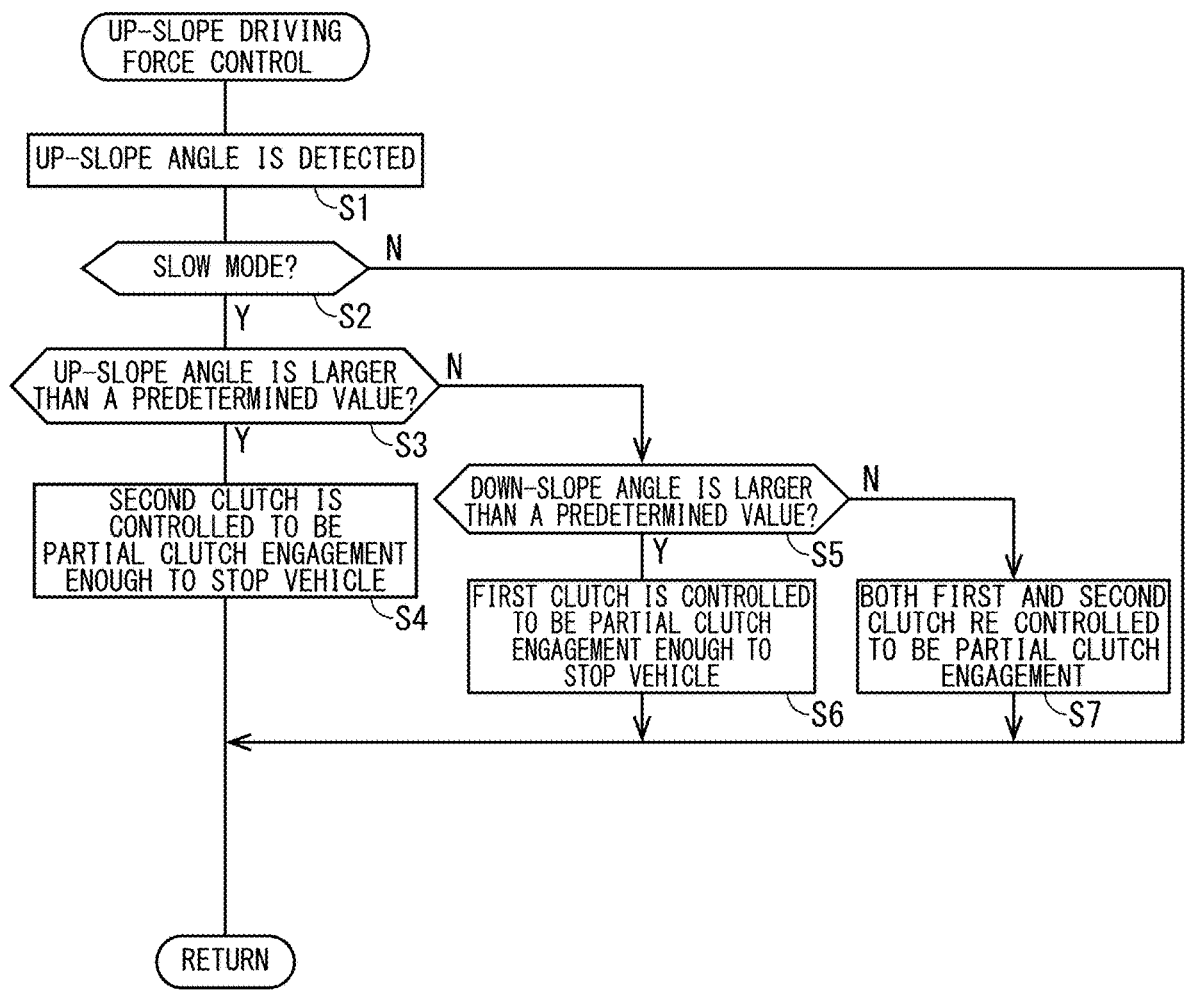
FIG. 7 is a flowchart showing up-slope driving force control.

FIG. 7 is a flowchart showing up-slope driving force control in this embodiment. As described above, the slow mode means a mode arbitrarily selected by a rider when a vehicle body is to be moved forward or backward at slow speed as in putting a vehicle in/out of a parking lot. In the present invention, it is not required to support the vehicle and apply a brake so as to prevent the vehicle from moving by an inclination even if a road surface is inclined in switching to the slow mode, and the present invention enables slow running in a state in which the vehicle is stable.

In a step S1, an up-slope angle of a road surface is detected by an up-slope angle sensor 139 that detects an inclination in a pitching direction of the vehicle body. In a step S2, it is determined whether the mode is switched to the slow mode or not and in a case of affirmative determination, a process proceeds to a step S3.

In the step S3, it is determined whether the up-slope angle is equal to or larger than a predetermined value (for example, +3 degrees) or not and in a case of affirmative determination, the process proceeds to a step S4. In the step S4, the second clutch 108B is controlled to be partial clutch engagement to an extent that the vehicle is stopped without rolling back. The partial clutch engagement is executed by supplying predetermined fixed clutch oil pressure or supplying clutch oil pressure predetermined to increase according to an up-slope angle. When rotation of the wheels is detected by a wheel speed sensor 170 after transition to the slow mode, it is judged whether rolling back prevention control is executed or not in addition to the case that the up-slope angle is equal to or larger than the predetermined value as described above.

When negative determination is made in the step S3, the process proceeds to a step S5. In the step S5, it is determined whether a down-slope angle is equal to or larger than a predetermined value (for example, −3 degrees) or not and in a case of affirmative determination, the process proceeds to a step S6. In the step S6, the first clutch 108A is controlled to be partial clutch engagement to an extent that the vehicle is stopped without rolling forward and a series of control is finished.

In a case of negative determination in the step S5, that is, when it is determined that a road surface is a flat where the up-slope angle and the down-slope angle are not equal to or do not exceed the predetermined value, both the first and second clutches are controlled to be partial clutch engagement to prevent the vehicle from moving forward or backward in the step 7.

In addition to the above-mentioned partial clutch engagement control for preventing the vehicle from moving, front and rear braking devices are operated and further, stability of the vehicle can be also enhanced. Operation of the braking device can be set to be performed when brake control force detected by a brake oil pressure sensor exceeds a predetermined value in addition to a case that braking operation is detected by the brake switch 140. Braking force applied by this brake control is released after the braking force is held in predetermined time since the braking operation is stopped and is released according to operation of the slow forward movement switch 64 or the slow backward movement switch 66.

Figure 8:
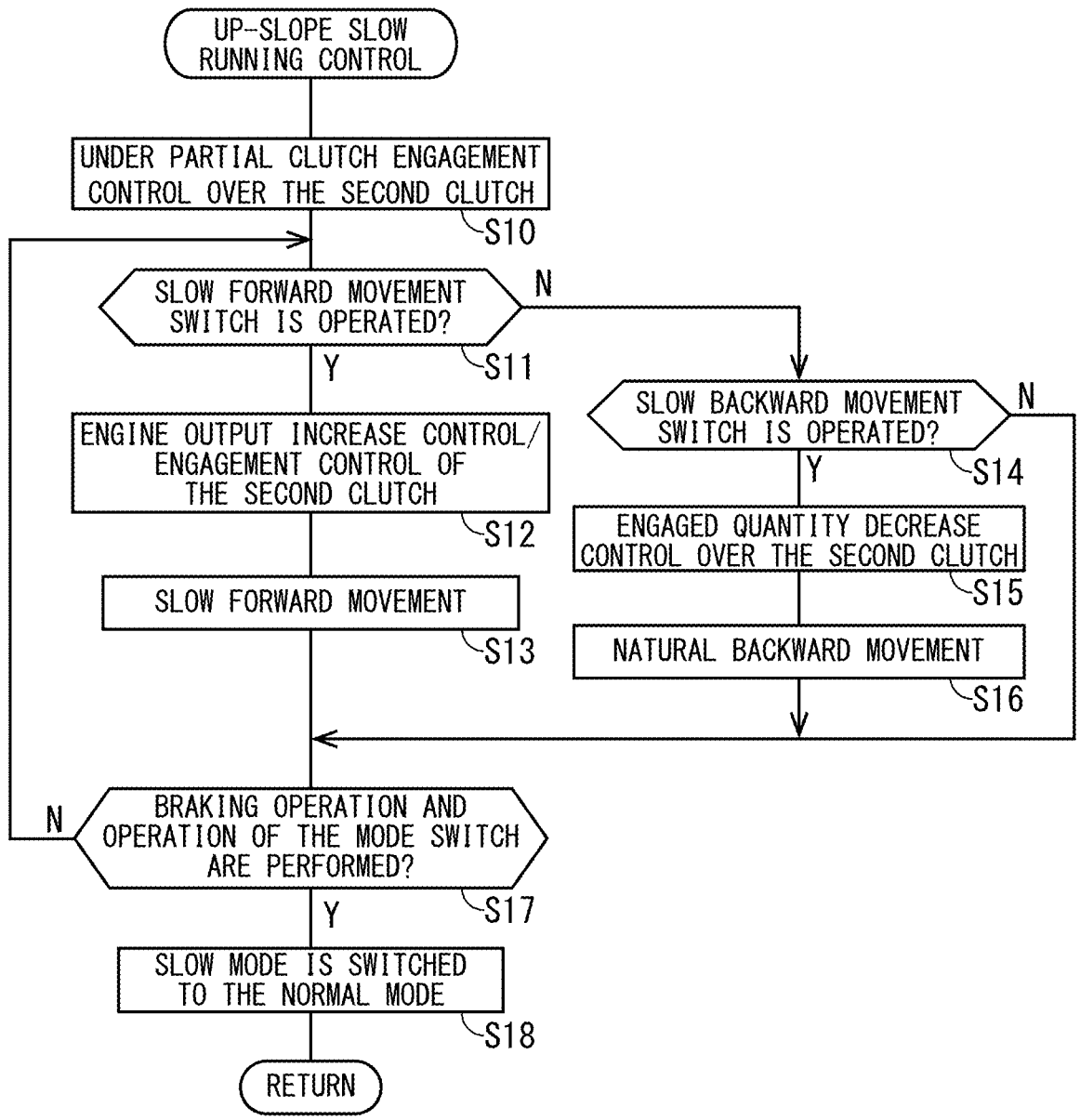
FIG. 8 is a flowchart showing up-slope slow running control.
Figure 9:
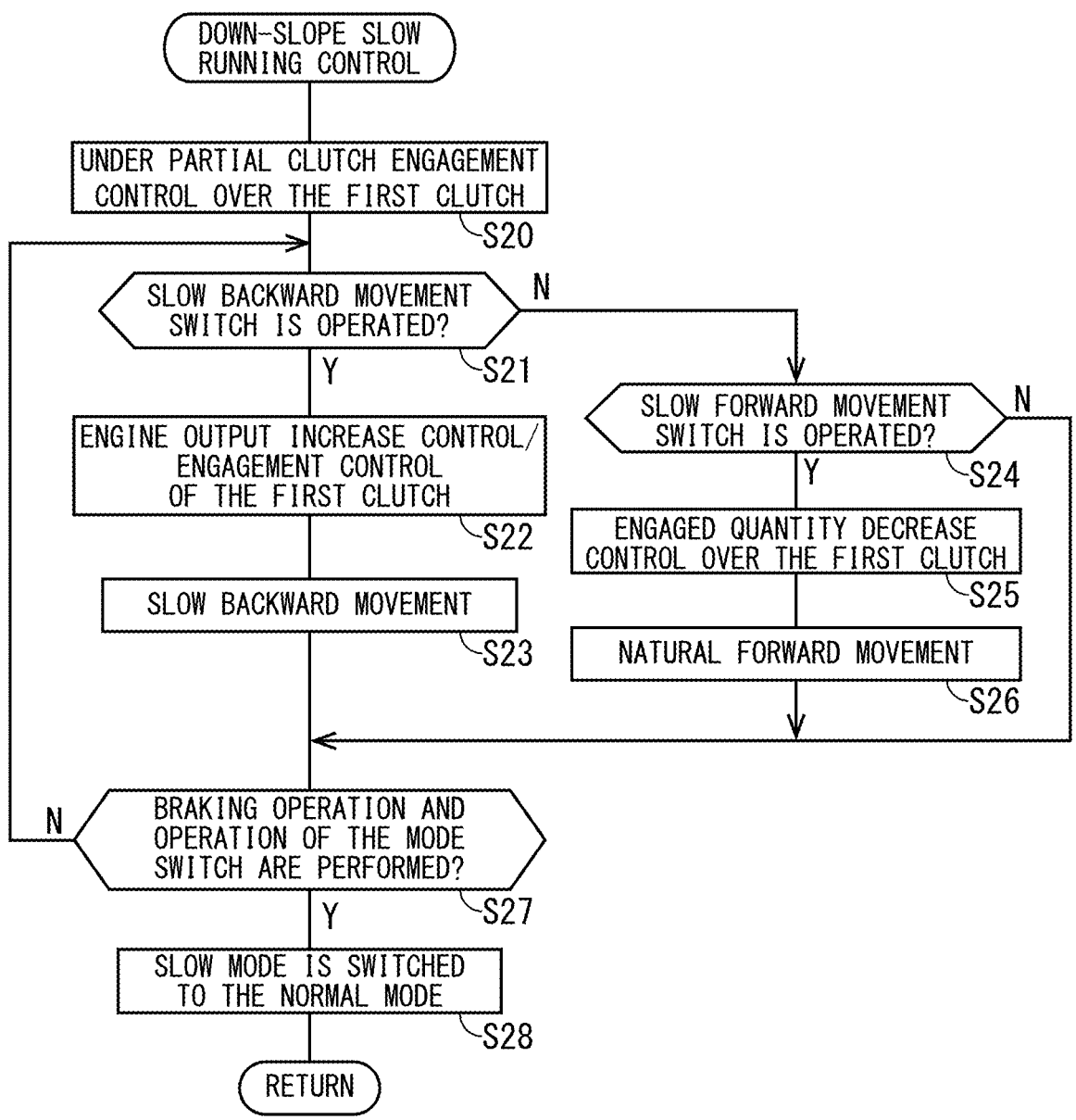
FIG. 9 is a flowchart showing down-slope slow running control.
Figure 10:
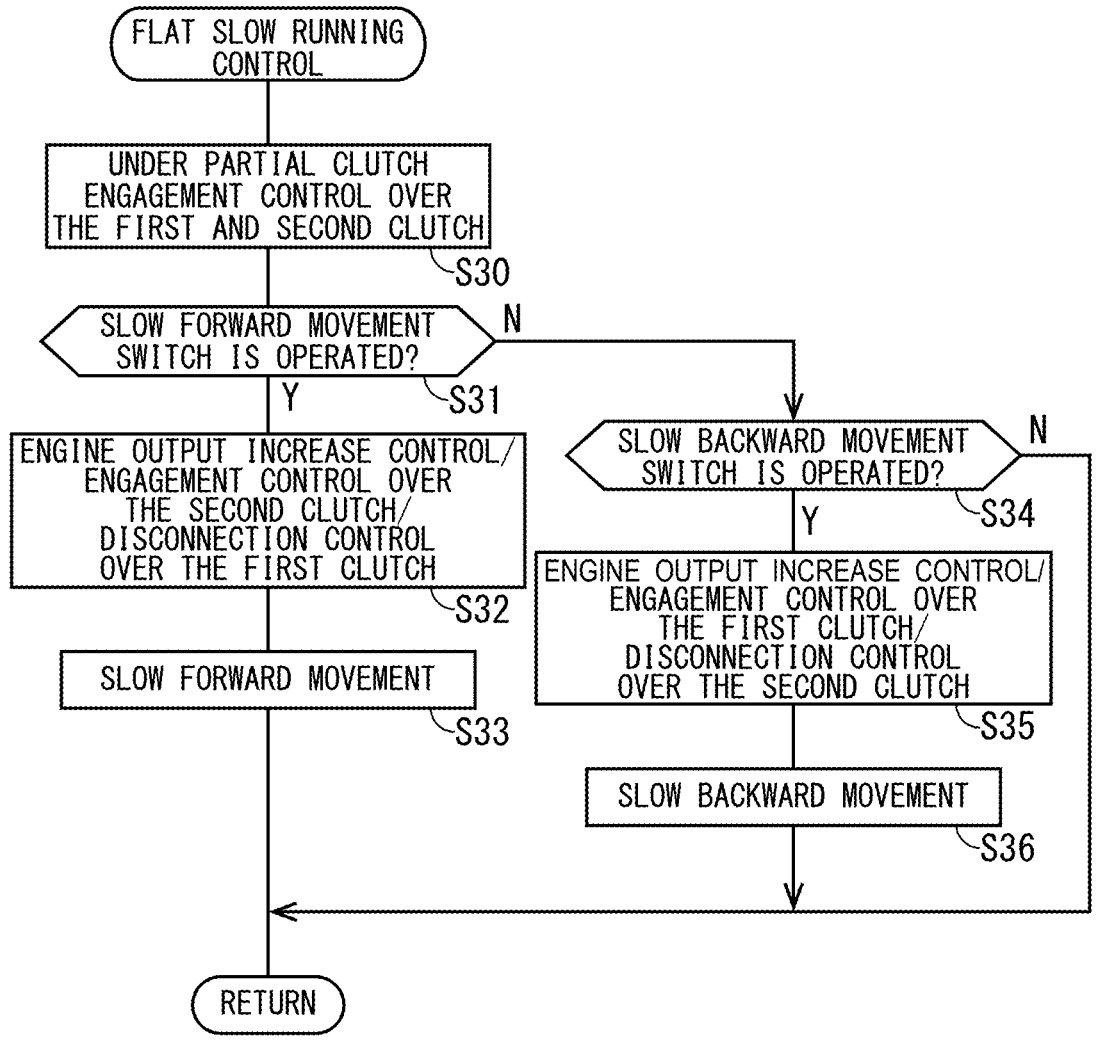
FIG. 10 is a flowchart showing flat slow running control.

Referring to FIGS. 8, 9, 10, a flow when the slow forward movement switch 64 or the slow backward movement switch 66 is operated while partial clutch engagement control for preventing the vehicle from moving is executed will be described below.

FIG. 8 is a flowchart showing up-slope slow running control. In a step S10, partial clutch engagement control over the second clutch 108B is executed because of an up-slope. In a step S11, it is determined whether the slow forward movement switch 64 is operated or not and in a case of affirmative determination, a process proceeds to a step S12.

In the step S12, engine output increase control and engagement control over the second clutch 108B are executed for slow forward movement. In a step S13, slow forward movement according to the control in the step S12 is performed. When operation of the slow forward movement switch 64 is stopped, the partial clutch engagement control in the step S10 is executed again and the vehicle is stably stopped.

In a case of negative determination in the step S11, the process proceeds to a step S14 and it is determined whether the slow backward movement switch 66 is operated or not and in a case of affirmative determination, the process proceeds to a step S15. In the step S15, engaged quantity decrease control over the second clutch 108B is executed. In a step S16, natural backward movement by gravity according to the control in the step S12 is performed. When operation of the slow backward movement switch 66 is stopped, the partial clutch engagement control in the step S10 is executed again and the vehicle is stably stopped. In the control in the step S15, the first clutch 108A may be also engaged to transmit engine driving force to the backward gears.

In a case of negative determination in the step S14, it is judged that the slow forward movement switch 64 and the slow backward movement switch 66 are not operated and the process proceeds to a step S17. In the step S17, it is determined whether braking operation and operation of the mode switch 67 are performed or not and in a case of affirmative determination, the process proceeds to a step S18. In the step S18, the slow mode is switched to the normal mode and a series of control is finished. In a case of negative determination in the step S17, the process is returned to the determination in the step S11.

FIG. 9 is a flowchart showing down-slope slow running control. In a step S20, partial clutch engagement control of the first clutch 108A is executed because of a down-slope. In a step S21, it is determined whether the slow backward movement switch 66 is operated or not and in a case of affirmative determination, a process proceeds to a step S22.

In the step S22, engine output increase control and engagement control of the first clutch 108A are executed for slow backward movement. In a step S23, slow backward movement according to the control in the step S22 is performed. When operation of the slow backward movement switch 66 is stopped, the partial clutch engagement control in the step S20 is executed again and the vehicle is stably stopped.

In a case of negative determination in the step S21, the process proceeds to a step S24, it is determined whether the slow forward movement switch 64 is operated or not, and in a case of affirmative determination, the process proceeds to a step S25. In the step S25, engaged quantity decrease control over the first clutch 108A is executed. In a step S26, natural forward movement by gravity according to the control in the step S22 is performed. When operation of the slow forward movement switch 64 is stopped, the partial clutch engagement control in the step S20 is executed again and the vehicle is stably stopped. In the control in the step S25, the second clutch 108B may be also engaged to transmit engine driving force to the second-speed gear.

In a case of negative determination in the step S24, it is judged that the slow forward movement switch 64 and the slow backward movement switch 66 are not operated and the process proceeds to a step S27. In the step S27, it is determined whether braking operation and operation of the mode switch 67 are performed or not and in a case of affirmative determination, the process proceeds to a step S28. In the step S28, the slow mode is switched to the normal mode and a series of control is finished. In a case of negative determination in the step S27, the process is returned to the determination in the step S21.

FIG. 10 is a flowchart showing flat slow running control. In a step S30, partial clutch engagement control over the first clutch 108A and the second clutch 108B is executed because of a flat. In a step S31, it is determined whether the slow forward movement switch 64 is operated or not and in a case of affirmative determination, the process proceeds to a step S32.

In the step S32, engine output increase control, engagement control over the second clutch 108B and disconnection control over the first clutch 108A are executed for slow forward movement. In a step S33, slow backward movement according to the control in the step S32 is performed and a series of control is finished. When operation of the slow forward movement switch 64 is stopped, the partial clutch engagement control in the step S30 is executed again and the vehicle is stably stopped.

In a case of negative determination in the step S31, the process proceeds to a step S34, it is determined whether the slow backward movement switch 66 is operated or not, and in a case of affirmative determination, the process proceeds to a step S35. In the step S35, engine output increase control, engagement control over the first clutch 108A and disconnection control over the second clutch 108B are executed for slow forward movement. In a step S36, slow backward movement according to the control in the step S35 is performed and a series of control is finished. When operation of the slow backward movement switch 66 is stopped, the partial clutch engagement control in the step S30 is executed again and the vehicle is stably stopped.

Engine driving force when slow forward movement on an up-slope or slow backward movement on a down-slope is performed can be varied according to a slop angle so as to be the same vehicle speed as that in slow forward/backward movement on a flat. In slow running control on a flat, the slow mode can be also switched to the normal mode by braking operation and operation of the mode switch 67.

For a condition for switching the neutral condition to the slow mode, the condition can be set to while the shift motor is halted, when the shift drum is located in the neutral position, when the throttle grip is fully closed, a state in which the vehicle is stopped (vehicle speed is equal to or below the predetermined value), a state in which the engine is operated in the idle condition, a state in which the brake switch is turned on, a state in which the side stand is lifted and when the mode switch 67 is operated.

For a condition for switching the slow mode to the normal mode, the condition can be set to while the shift motor is halted, when the shift drum is located in a position in the slow mode, when the throttle grip is fully closed, a state in which the vehicle is stopped (vehicle speed is equal to or below the predetermined value) and a state in which the brake switch is turned on and the mode switch 67 is operated.

The controller 106 can combine engine output control and clutch control for control for keeping speed of slow forward movement or slow backward movement fixed. For example, when vehicle speed exceeds the predetermined value while the first clutch 108A is connected and slow forward movement is performed, the crankshaft can be decelerated by partially engaging the first clutch together with the second clutch 108B utilizing a clutch interlock phenomenon.

As described above, according to the driving force control device for the saddled vehicle according to the present invention, when the slow mode is selected and neither the slow forward movement switch nor the slow backward movement switch 66 is operated, the second clutch 108B on the slow forward side is held in a partial clutch engagement condition on an up-slope, the first clutch 108A on the slow backward side is held in the partial clutch engagement condition on a down-slope respectively so as to prevent the motorcycle 1 from moving forward or backward, and the first clutch 108A and the second clutch 108B are held in the partial clutch engagement condition on a flat. Accordingly, forward/backward movement of the vehicle body in the slow mode can be prevented without operating the braking device, the rider can concentrate in operation of the slow forward/backward movement switch, and stability in handling the vehicle body can be enhanced.

The contours and the structure of the engine, the transmission and the dual clutch, the contour and structure of the mode switch, the structure of the oil pressure path of the clutch, the structure of the braking device and others are not limited to the above-mentioned embodiment and various variations are allowed. For example, as for setting of the switch while the slow mode is selected, when the shift-up switch 64 is pushed, the vehicle may be also moved back and when the shift-up switch 66 is pushed, the vehicle may be also advanced.

For a destination for applying braking force when an inclination is detected in the slow mode, any of only the front wheel, only the rear wheel and both the front and rear wheels can be selected according to an inclination direction of either an up-slope or a down-slope in addition to a dimension of the inclination, and besides, each braking force can be differentiated. Concretely, in a case of the down-slope, braking force may be also applied to the front wheel to which a load is applied and in a case of the up-slope, braking force may be also applied to the rear wheel to which a load is applied. Various settings such as the braking force, the vehicle speed and the inclination angle respectively described above can be arbitrarily changed according to characteristics of the vehicle. The driving force control device for the saddled vehicle according the present invention is not limited to the motorcycle and can be applied to various vehicles such as straddle-type three-wheeled and four-wheeled vehicles.

EXPLANATION OF SIGN

1 . . . vehicle, 40 . . . transmission, 62 . . . front brake disc, 63 . . . rear brake disc, 64 . . . shift-up switch (slow forward movement switch, shift operation means), 66 . . . shift-down switch (slow backward movement switch, shift operation means), 67 . . . mode switch, 69 . . . cruciform button, 70 . . . rear disc brake, 100 . . . engine, 106 . . . controller, 108 . . . twin clutch (clutch), 108A . . . first clutch, 108B . . . second clutch, 110 . . . main shaft, 110*i* . . . inner shaft, 110*o* . . . outer shaft, 112 . . . countershaft, 114 . . . shift motor, 139 . . . up-slope angle sensor, 144 . . . TBW motor, 156 . . . slow mode transition determining unit, 158 . . . normal mode transition determining unit, 162 . . . forward/backward movement clutch hydraulic control unit, 164 . . . drum operation control unit

The invention claimed is:

1. A driving force control device for saddled vehicle, comprising: a transmission that transmits driving force of an engine to a driving wheel of a vehicle at predetermined reduction ratio; a clutch that connects/disconnects the driving force between the engine and the transmission; and a controller that controls the transmission and the clutch,
wherein the controller is configured to enable selecting a normal mode in which the reduction ratio of the transmission is varied according to a running condition and a slow mode for enabling slow forward movement and slow backward movement by varying the reduction ratio of the transmission to fixed reduction ratio according to predetermined operation,
the controller holds the clutch in a partial clutch engagement condition so as to prevent the vehicle from moving forward or backward when the slow mode is selected and no predetermined operation is performed, and
the clutch is a dual clutch including a first clutch engaged in the slow backward movement and a second clutch engaged in the slow forward movement,
means for detecting an inclination in a pitching direction of the vehicle is provided,
in a case of an up-slope, the second clutch is held in a partial clutch engagement condition, and
in a case of a down-slope, the first clutch is held in the partial clutch engagement condition,
wherein the controller executes control for holding the clutch in the partial clutch engagement condition in spite that brake operation for the vehicle is not operated when an inclination in a pitching direction is equal to or exceeds a predetermined value while the slow mode is selected.

2. The driving force control device for saddled vehicle according to claim 1, wherein the controller holds both the first clutch and the second clutch in the partial clutch engagement condition when a road surface is judged as a flat hardly inclined in the pitching direction.

3. The driving force control device for saddled vehicle according to claim 1, wherein predetermined operation for slow forward movement or slow backward movement in the slow mode is an operation of shift switch for directing shift up and shift down of the transmission.

4. The driving force control device for saddled vehicle according to claim 3,
wherein the transmission includes a plurality of forward gears and a single backward gear, and
when the slow mode is selected, the first clutch is engaged for transmitting the driving force by the backward gear, the second clutch is engaged for transmitting the driving force by the second-speed gear out of the plurality of forward gears.

5. The driving force control device for saddled vehicle according to claim 1, comprising a mode switch for switching the normal mode to the slow mode.

6. The driving force control device for saddled vehicle according to claim 1, comprising
braking devices that make the driving wheel of the vehicle and another wheel generate braking force,
wherein the controller holds braking force in predetermined time even if control force decreases when the control force of the braking devices is equal to or exceeds a predetermined value while the slow mode is selected.

7. The driving force control device for saddled vehicle according to claim 6, wherein when the predetermined operation for the slow forward movement and the slow backward movement is performed while the braking force is held, the braking force is released after the driving force starts to be transmitted to the driving wheel.

8. The driving force control device for saddled vehicle according to claim 1,
wherein a throttle controller that adjusts output of the engine is a throttle-by-wire type for driving a throttle valve by a motor according to at least turning angle information of a throttle grip, and
while the slow mode is selected, turning operation for output of the engine of the throttle grip is invalidated.

9. The driving force control device for saddled vehicle according to claim 1,
wherein the clutch is a dual clutch configured by a first clutch engaged in the slow backward movement and a second clutch engaged in the slow forward movement,
a wheel speed sensor for detecting wheel speed of the vehicle is provided,
the controller judges an inclination in a pitching direction of the vehicle on the basis of the wheel speed in a state in which the slow mode is selected,
the second clutch is held in the partial clutch engagement condition in a case of an up-slope, and
the first clutch is held in the partial clutch engagement condition in a case of a down-slope.

10. The driving force control device for saddled vehicle according to claim 2, wherein predetermined operation for slow forward movement or slow backward movement in the slow mode is an operation of shift operation switch for directing shift up and shift down of the transmission.

11. The driving force control device for saddled vehicle according to claim 10,
wherein the transmission includes a plurality of forward gears and a single backward gear, and
when the slow mode is selected, the first clutch is engaged for transmitting the driving force by the backward gear, the second clutch is engaged for transmitting the driving force by the second-speed gear out of the plurality of forward gears.

12. The driving force control device for saddled vehicle according to claim 2, comprising a mode switch for switching the normal mode to the slow mode.

13. The driving force control device for saddled vehicle according to claim 3, comprising a mode switch for switching the normal mode to the slow mode.

14. The driving force control device for saddled vehicle according to claim 4, comprising a mode switch for switching the normal mode to the slow mode.

15. The driving force control device for saddled vehicle according to claim 2, comprising
braking devices that make the driving wheel of the vehicle and another wheel generate braking force,
wherein the controller holds braking force in predetermined time even if control force decreases when the control force of the braking devices is equal to or exceeds a predetermined value while the slow mode is selected.

16. The driving force control device for saddled vehicle according to claim 15, wherein when the predetermined operation for the slow forward movement and the slow backward movement is performed while the braking force is held, the braking force is released after the driving force starts to be transmitted to the driving wheel.

17. The driving force control device for saddled vehicle according to claim 2,
wherein a throttle controller that adjusts output of the engine is a throttle-by-wire type for driving a throttle valve by a motor according to at least turning angle information of a throttle grip, and
while the slow mode is selected, turning operation for output of the engine of the throttle grip is invalidated.

18. The driving force control device for saddled vehicle according to claim 3, comprising
braking devices that make the driving wheel of the vehicle and another wheel generate braking force,
wherein the controller holds braking force in predetermined time even if control force decreases when the control force of the braking devices is equal to or exceeds a predetermined value while the slow mode is selected.

19. The driving force control device for saddled vehicle according to claim 18, wherein when the predetermined operation for the slow forward movement and the slow backward movement is performed while the braking force is held, the braking force is released after the driving force starts to be transmitted to the driving wheel.

20. The driving force control device for saddled vehicle according to claim 3,
wherein a throttle controller that adjusts output of the engine is a throttle-by-wire type for driving a throttle valve by a motor according to at least turning angle information of a throttle grip, and
while the slow mode is selected, turning operation for output of the engine of the throttle grip is invalidated.

* * * * *